July 25, 1967  C. L. AUSTIN ET AL  3,332,293
VIBRATORY APPARATUS

Filed Dec. 2, 1963  4 Sheets-Sheet 1

INVENTORS
CURTIS L. AUSTIN
ROBERT N. BATESON
HAROLD V. PERTTULA
TAKUZO TSUCHIYA
BY L. MeRoy Lillehaugen
ATTORNEY INVENTORS
CURTIS L. AUSTIN
ROBERT N. BATESON
HAROLD V. PERTTULA
TAKUZO TSUCHIYA
BY L. McRoy Lillehaugen
ATTORNEY July 25, 1967

C. L. AUSTIN ET AL 3,332,293

VIBRATORY APPARATUS

Filed Dec. 2, 1963

INVENTORS
CURTIS L. AUSTIN
ROBERT N. BATESON
HAROLD V. PERTTULA
TAKUZO TSUCHIYA

BY L. Melroy Lillehaugen
ATTORNEY

July 25, 1967  C. L. AUSTIN ET AL  3,332,293
VIBRATORY APPARATUS

Filed Dec. 2, 1963  4 Sheets-Sheet 4

INVENTORS
CURTIS L. AUSTIN
ROBERT N. BATESON
HAROLD V. PERTTULA
TAKUZO TSUCHIYA
BY L. McRoy Lillehaugen
ATTORNEYS

United States Patent Office 3,332,293
Patented July 25, 1967

3,332,293
VIBRATORY APPARATUS
Curtis L. Austin, Robert N. Bateson, Harold V. Perttula, and Takuzo Tsuchiya, Minneapolis, Minn., assignors to General Mills, Inc., a corporation of Delaware
Filed Dec. 2, 1963, Ser. No. 327,325
10 Claims. (Cl. 74—61)

The present invention pertains to a vibratory apparatus for producing a vibratory force which can be varied in magnitude while the apparatus is in operation, and more particularly to an adjusting mechanism for use with a vibratory apparatus for changing the phase angle of a pair of eccentrically weighted rotatable shafts within the apparatus, with respect to each other while the shafts are rotating, thereby varying the magnitude of vibratory force produced.

Various types of oscillators or vibrators for causing a horizontal vibratory conveyor, screen, oven, or other similar vibratory device to vibrate, are well known in the art. Such devices normally include one or more rotatable eccentric weights which cause the conveyor or similar device to vibrate at a prescribed amplitude, as the weight is rotated. If two or more eccentric weights are used, they are usually caused to rotate in opposite directions by mounting them on two shafts which are rotated in opposite directions. A motor is provided for rotating one of the shafts in one direction, and appropriate means are provided for rotating the second shaft in the opposite direction.

Oscillators or vibrators of this nature have also been used in helical or vertical conveyors as well. According to the known state of the art, the oscillator or vibrator which produces the vibratory force is mounted either at the top of the helical conveyor, at the bottom of the conveyor, or at some point between the two ends of the conveyor, and it generally includes one or more eccentric weights mounted for relative rotation so as to produce a vibratory thrust force which causes the conveyor system to execute oscillations along a helically extending line. Material which is deposited in the bottom of the conveyor is conveyed along an ascending helical path. If two or more eccentric weights are used for creating the vibratory force, they are ofttimes mounted on two shafts and caused to rotate either in opposite directions, or in the same direction with respect to each other. The direction of rotation of the weights relative to each other depends upon the specific design of the conveyor system, the relative positioning of the springs with respect to conveyor platform, the manner in which the conveyor pan is attached to the springs, the type of springs used, etc.

Normally, a single oscillator is used in the above systems for producing the vibratory force, this is particularly true where the vibratory conveyor, or similar device, is relatively small in nature. In order to increase or decrease the magnitude of vibratory force produced by the oscillator, the relative position of the eccentric weights with respect to each other is normally changed while the oscillator is stopped. On large vibratory conveyors on the other hand, two oscillator units are sometimes used to obtain the required force to drive the conveyor. Each oscillator produces a fraction of the total driving force which causes the vibratory movement. In order to increase or decrease the magnitude of force created by the two oscillators, the phase relationship of the weights in one oscillator with respect to the weights in the other oscillator is changed. According to the known state of the art, this is accomplished by stopping the conveyor and making the necessary adjustments to vary the phase relationship of the weights.

Accordingly, one object of the present invention is to provide an apparatus for producing a vibratory force which can be varied in magnitude while the apparatus is in operation.

Another object is to provide a vibratory apparatus for causing a conveyor or similar device to vibrate at a prescribed amplitude, the oscillator having improved means for varying the magnitude of vibratory force produced.

A further object is to provide a vibratory apparatus which is caused to vibrate by the rotation of at least one eccentrically weighted shaft, the magnitude of vibration produced by the apparatus being variable from a maximum magnitude to zero, or vice versa, while the apparatus is in operation.

A still further object is to provide an improved mechanism for changing the phase angle of a pair of parallel shafts with respect to each other while the shafts are rotating.

Another object is to provide a mechanism operatively connected to two rotating parallel eccentrically weighted shafts of a vibratory apparatus, for varying the phase relationship of the eccentric masses with respect to each other while the shafts are rotating.

Still another object is to provide an improved mechanism for changing the magnitude of vibratory force produced by a motion transmitting apparatus which is simple in construction, simple to operate, inexpensive to make, and which requires minimum effort and cost to maintain.

Other objects and advantages of this invention will become apparent from a consideration of the following specification and accompanying drawings. Before proceeding with a detailed description of the invention however, a brief description of it will be presented.

Preferably, the vibratory apparatus of the present invention includes a pair of spaced apart oscillator housings attached to a conveyor or similar device, in such a manner that when they are actuated, they produce a vibratory force and impart vibratory motion to the conveyor. A pair of parallel shafts are rotatably mounted within each oscillator housing; said shafts are mounted in their respective housings so that the distance between the pairs of shafts remains constant. An eccentrically weighted spur gear is fixedly connected to each shaft. The gears in each housing mesh with each other, and they are positioned with respect to each other so that a desired phase relationship between said weighted gears exists. A timing belt, comprised of first and second runs, is provided for operatively connecting one of the shafts mounted in one housing, to one of the shafts mounted in the other housing; and a motor is provided for rotating one of the shafts about its axis, thereby actuating both oscillators. A bell crank (which includes a pair of fixed length arms which meet at one end to form an apex) is interposed between the oscillator housings and pivotally connected relative to the housings and the conveyor. An idler pulley is rotatably mounted adjacent the end of each arm of the bell crank. All of the pulleys lie in substantially the same plane, and the idler pulleys deflect the runs of the timing belt. By pivoting the bell crank about its pivot point, the relative length of each run is changed, and the phase relationship of the shafts and weights in one housing with respect to the shafts and weights in the other housing is changed. As a result the magnitude of vibratory force produced by the apparatus can be changed while the apparatus is in operation.

The invention will best be understood by reference to the following drawings, wherein.

Figure 1:
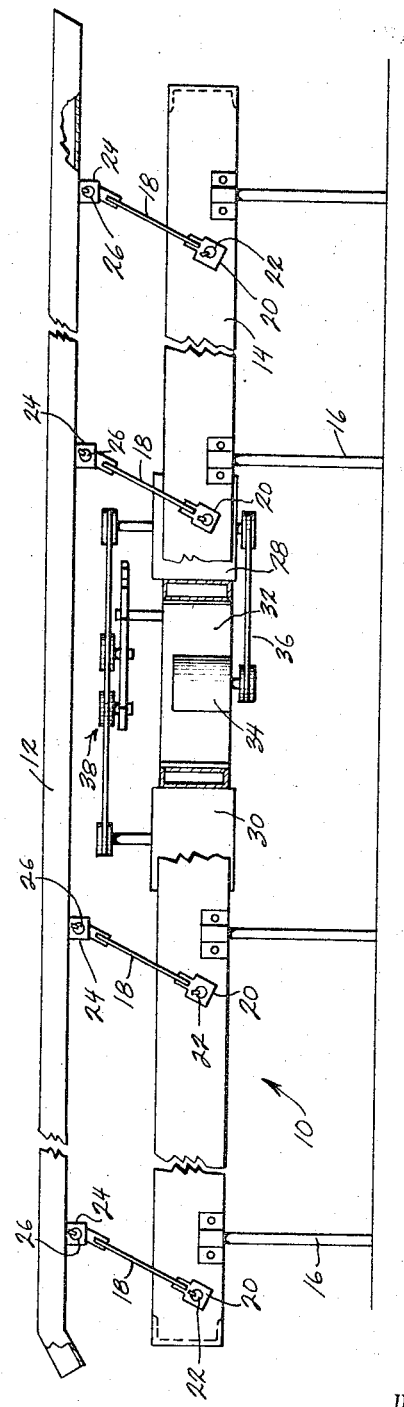
FIGURE 1 is a side elevational view with parts broken away, illustrating the invention attached to a horizontal vibratory conveyor.

FIGURE 1 illustrates a vibratory apparatus designated generally by reference numeral 10, mounted so as to transmit a vibratory force to a conveyor platform or feeder 12, thereby causing the conveyor to vibrate at a prescribed amplitude. It must be recognized that although the invention is shown and described herein in conjunction with a conveyor or feeder, it might readily be used with other types of vibratory devices as well, such as vibratory screens, vibratory ovens, and the like. The vibratory apparatus 10 is attached to an intermediate support frame 14, the frame 14 being mounted on a plurality of spring legs 16 which rest upon a floor. The conveyor 12 is mounted on a plurality of leaf springs 18 which resiliently support the conveyor 12 relative to the frame 14. The springs 18 are connected to the frame 14 by spring mounting blocks 20 which are fastened to shafts 22 by appropriate means (such as welding or keys) and to the conveyor platform 12 by mounting blocks 24, which are fastened to shafts 26 in a like manner; if desired the shafts 26 might be free to pivot in the mounting blocks 24. As the vibratory apparatus 10 is actuated, a vibratory force is transmitted to the conveyor 12, even though the frame 14 to which the apparatus is attached remains relatively stationary, in a manner now well known to those skilled in the art.

Figure 2:
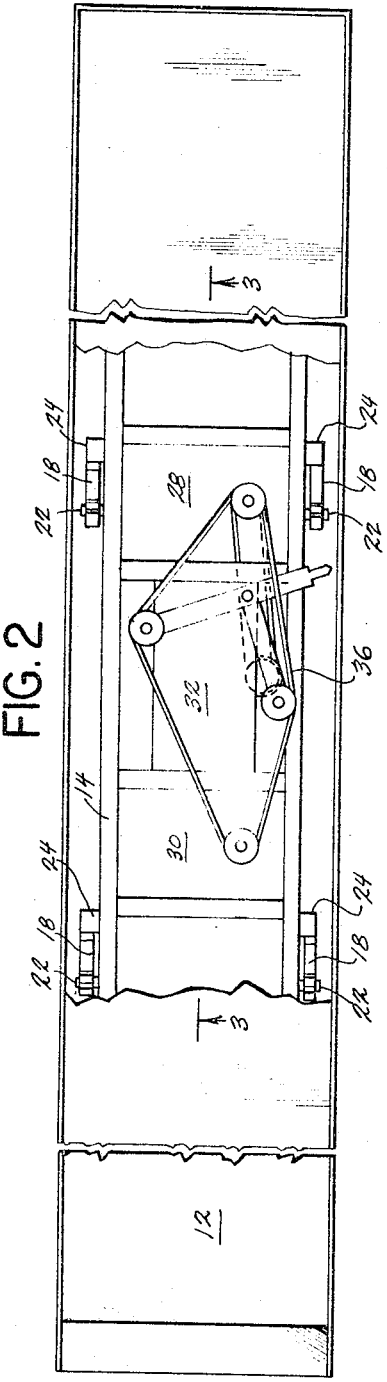
FIGURE 2 is a top plan view with parts broken away illustrating the structure depicted in FIGURE 1.

The vibratory apparatus 10 is comprised of a first oscillator housing 28 and a second oscillator housing 30. As illustrated in FIGURES 1 and 2, the oscillator housings are aligned along the longitudinal axis of the conveyor in such a manner that the first housing 28 is positioned behind the housing 30, i.e. to the right of the housing 30 when viewed in FIGURES 1 and 2. Each housing is secured to the intermediate frame 14 by appropriate means and they are separated from each other by means of a frame member 32. A motor 34 is fixedly connected to the frame member 32 and it is operatively connected to the housing 30 by means of a belt 36. An adjusting mechanism, designated generally by reference numeral 38, is operatively connected to each housing in a manner to be described hereinafter.

Figure 4:
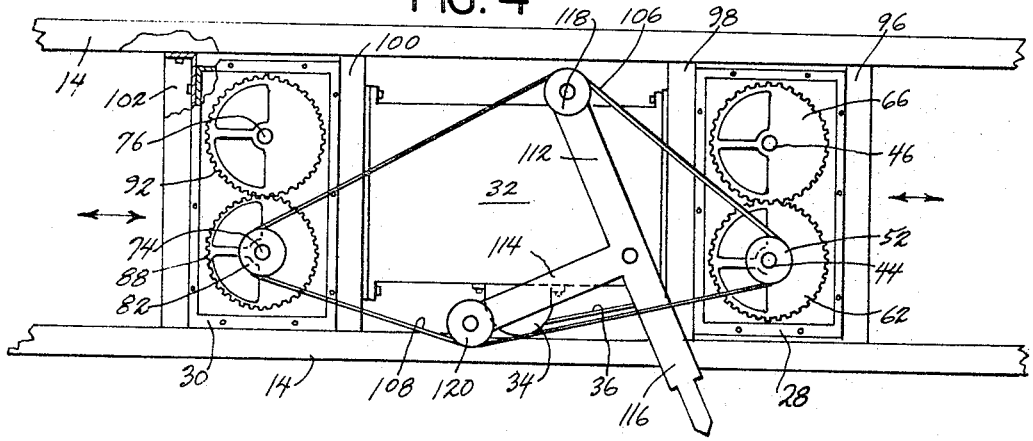
FIGURE 4 is a plan view of the vibratory apparatus illustrated in FIGURE 3, with the covers of the oscillator housings removed.
Figure 3:
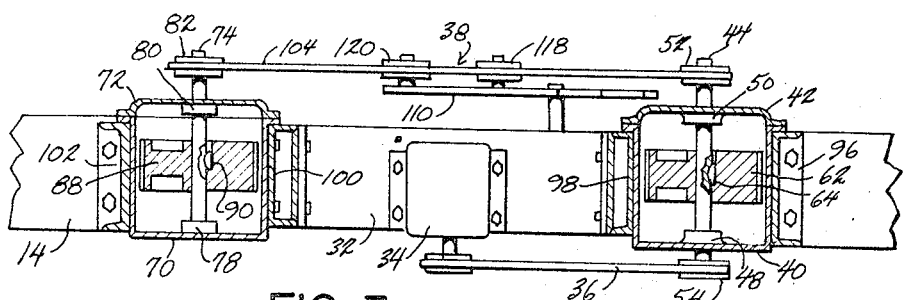
FIGURE 3 is an enlarged sectional view of the vibratory apparatus taken along line 3—3 of FIGURE 2, illustrating the apparatus when a maximum vibratory force is produced.

FIGURES 3 and 4 illustrate the vibratory apparatus 10 and the manner in which it is attached to the frame support 14, in greater detail. As noted above, the vibratory apparatus includes the oscillator housings 28 and 30. The housing 28 is comprised of a main body 40, and a cover 42 secured thereto by appropriate means. Rotatably mounted within the housing 28 are two parallel shafts, a first shaft 44 and a second shaft 46. The shaft 44 is journaled in the body 40 and the cover 42 by bearings 48 and 50 respectively. Each end of the shaft 44 projects through the housing 28; a sheave or pulley 52 is fixedly connected to one end of the shaft 44 and a sheave or pulley 54 is fixedly connected to the other end of the shaft 44. The sheave 54 is operatively connected to the motor 34 by means of the belt 36. The shaft 46 is likewise rotatably mounted with respect to the main body 40 and the cover 42 by appropriate bearings (not shown).

A pair of eccentric weights are positioned within the housing 28, comprised of a first spur gear 62, which is fixedly connected to the shaft 44 by means of a key 64, and a second spur gear 66 which is fixedly connected to the shaft 46 by similar means. The gears are eccentrically weighted to provide an unbalanced mass, preferably, by using a gear having a portion removed therefrom between the axis and the periphery of the gear. This provides a spur gear having an eccentrically weighted portion which forms an integral part of the gear. Other ways of eccentrically weighting the spur gears are available as well, such as attaching a weight to one surface of the gear, the weight being place off center with respect to the gear axis. By using the spur gears as shown in FIGURES 3 and 4, a minimum amount of space is required, and the weights will not come lose from the gear. Other types of eccentric weights could be used as well. Different types will be described below. The parallel shafts 44 and 46 are spaced relative to each other so that the gears 62 and 66 mesh with each other and rotate in opposite directions.

The oscillator housing 30 is substantially the same as the housing 28; it is comprised of a main body 70, and a cover 72 secured thereto by appropriate means. Rotatably mounted within the housing 30 are two parallel shafts 74 and 76. The first shaft 74 is journaled in the body 70 and the cover 72 by bearings 78 and 80 respectively; and it projects through the cover 72. A sheave or pulley 82 is fixedly connected to the projecting end of the shaft 74. The shaft 76 is also rotatably mounted with respect to the body 70 and the cover 72 by means of bearings (not shown). Both of the housings can be at least partially filled with a lubricating oil if desired, and appropriate oil seals provided to prevent leakage of oil from the housings.

A pair of eccentric weights are positioned within the housing 30, comprised of a first spur gear 88, which is fixedly connected to the shaft 74 by means of a key 90, and a second spur gear 92 which is fixedly connected to the shaft 76 by similar means. The spur gears 88 and 92 are eccentrically weighed in a similar manner as the spur gears 62 and 66 described above. The parallel shafts 74 and 76 are spaced relative to each other so that the spur gears 88 and 92 mesh with each other and rotate in opposite directions. Note that all of the shafts 44, 46, 74 and 76, are parallel with respect to each other, the shafts 44 and 74 lie on one side of the longitudinal centerline of the conveyor, and the shafts 46 and 76 lie on the other side of the centerline. Note further that the oscillator housings 28 and 30 are mounted relative to the conveyor so that lines connecting the shafts 44 and 46 together, and 74 and 76 together, are transverse to the longitudinal axis of the conveyor. The eccentrically weighed gears in each housing are phased with respect to each other so that a desired phase relationship exists between the weights in each pair; and further, so that a desired phase relationship exists between the weights in one housing with respect to the weights in the other housing.

As shown in FIGURE 4, the oscillator housings 28 and 30 are positioned with respect to each other so that the housing 30 is positioned to the left of the housing 28, as viewed in this figure. The housing 28 is connected to the frame support 14 by securing it to a pair of cross members 96 and 98 by appropriate means; each cross member in turn being connected at its ends to the frame support 14 by appropriate means. In a like manner, the housing 30 is connected to the frame 14 by attaching it to a pair of cross members 100 and 102, each cross member in turn being connected at its ends to the frame support 14. The frame member 32 is connected at its ends to the cross members 98 and 100. As noted hereinbefore, the motor 34 is fixedly connected to the frame member 32, and it is operatively connected to the shaft 44, and more particularly the pulley 54 by means of the belt 36.

The oscillator housing 30, and more particularly the shaft 74, is operatively connected to the housing 28, and more particularly the shaft 44, by means of a continuous flexible, fixed length drive means, such as a timing belt 104. The timing belt 104 includes a first run 106 and a second run 108. As viewed in FIGURE 4, the first run 106 lies on one side of the shafts 44 and 74, and the pulleys 52 and 82, and the second run 108 lies on the other side of these shafts and pulleys; together, they form a geometrical shape when viewed from the top. Timing belts of this nature are used in order to achieve a positive drive between the shafts 44 and 74.

As noted in FIGURES 3 and 4, all the weights are phased with respect to each other so that a maximum vibratory force is imparted to the conveyor platform 12 when the oscillators are actuated, that is, all the weights fully complement each other so as to produce a straight line vibratory force which is parallel to the longitudinal axis of the conveyor. Note the arrows in FIGURE 4. In order to change the magnitude of vibration, the phase relationship of the weights in one housing is changed with respect to the weights in the other housing. This is accomplished by means of the adjusting mechanism 38. The adjusting mechanism 38 includes a bell crank 110 comprised of a pair of fixed length arms 112 and 114 which meet at one end to form an apex. The bell crank 110 is interposed between the oscillator housings and it is pivotally connected relative to the housings 28 and 30 and the conveyor platform 12, by connecting it at its apex to the frame member 32 along a line connecting the shafts 44 and 74 together. A handle 116 is provided for pivoting the bell crank through a prescribed angle. Rotatably mounted adjacent the end of each arm 112 and 114, are idler pulleys 118 and 120 respectively. The bell crank 110 is connected to the frame member 32 so that the idler pulleys 118 and 120 lie in the same horizontal plane as the pulleys 52 and 82; the pulley 118 deflects the first run 106 of the belt 104; and the pulley 120 deflects the second run 108, thereby forming a first geometrical shape.

Figure 5:
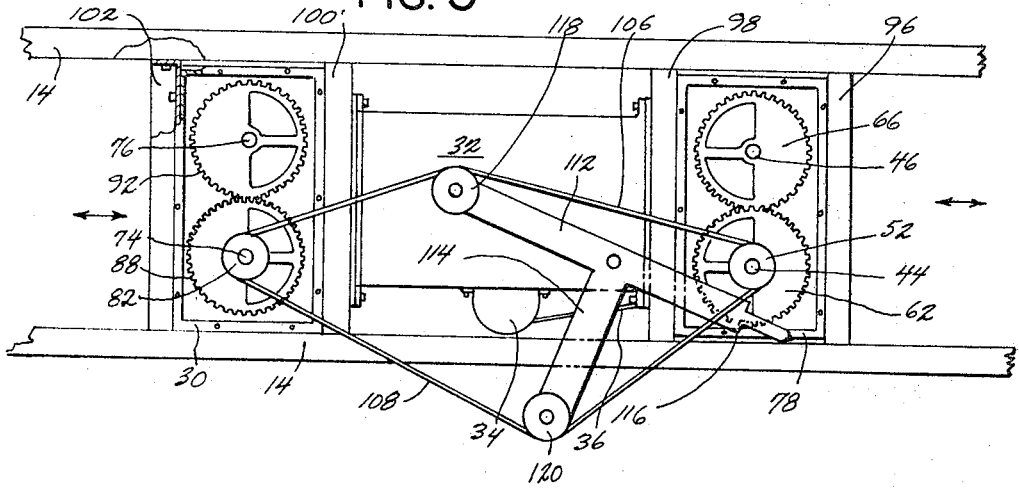
FIGURE 5 is a view similar to FIGURE 4 but depicting the vibratory apparatus when no vibratory force is produced by the apparatus.

FIGURE 5 illustrates the adjusting mechanism 38, and the eccentric weights in each housing after a phase shift has been achieved. Note that the bell crank 110 has been pivoted through a prescribed angle. By pivoting the bell crank in this manner, the relative lengths of the runs 106 and 108 of the timing belt are changed, and a second geometrical shape is formed. As illustrated, the first run 106 has been shortened and the second run 108 has been lengthened. It is pointed out, that although the relative lengths of the first and second runs have been changed, the overall length of the belt 104 has undergone no substantial change. Note that the eccentric weights in the oscillator housing 30 have been revolved 180° with respect to the weights in the housing 28, and with respect to their position shown in FIGURE 4. When the weights in the two housings are in this position, with respect to each other, no vibratory force is produced and no motion is imparted to the conveyor platform, in other words, the eccentric weights cancel each other out.

In operation, when the motor 34 is energized, the first oscillator 28 is actuated. The motor 34, which is operatively connected to the shaft 44 by means of the belt 36, causes the shaft 44 and the spur gear 62 to rotate about the longitudinal axis of the shaft 44. The shaft 46 and the spur gear 66 are caused to rotate about the axis of the shaft 46 in a counter direction with respect to the shaft 44 by virtue of the meshing engagement of the spur gears 62 and 66. The oscillator 30 is likewise actuated when the motor 34 is energized, by means of the timing belt 104 which operatively connects the oscillators together. The timing belt 104 causes the pulley 82, the shaft 74, and the spur gear 88 to rotate about the longitudinal axis of the shaft 74, in the same direction of rotation as the pulley 52, the shaft 44, and the weight 62. The shaft 76 and the spur gear 94 are caused to rotate about the axis of the shaft 76 in a counter direction with respect to the shaft 74, by virtue of the meshing engagement of the gears 88 and 92. Note however, that the shafts 46 and 76 rotate in the same direction.

In order to change the magnitude of vibratory force produced by the vibratory apparatus 10, the phase relationship of the weights 88 and 92, with respect to the weights 62 and 66 must be changed. By pivoting the bell crank 110 about its pivot point, the relative lengths of the first and second runs 106 and 108 are changed, and the weights 88 and 92 are revolved about the longitudinal axis of their respective shafts while the shafts are rotating. Note that pivotal movement of the bell crank 110 causes a different geometrical shape of the belt 104 to be formed, when viewed from the top. By changing the relative lengths of the first and second runs 118 and 120, the weights 88 and 92 are revolved with respect to the weights 62 and 66, so that the phase relationship of the weights 88 and 92 with respect to the weights 62 and 66 is changed, and the output force produced by the two oscillators cancel each other out, so that no vibratory force is produced by the vibratory apparatus. By changing the phase relationship of the eccentrically weighted spur gears in the two housings, the magnitude of vibratory force created by the vibratory apparatus can be varied from a zero force to a maximum force, or in varying intermediate ranges, by a simple adjustment of the bell crank 104.

Figure 6:
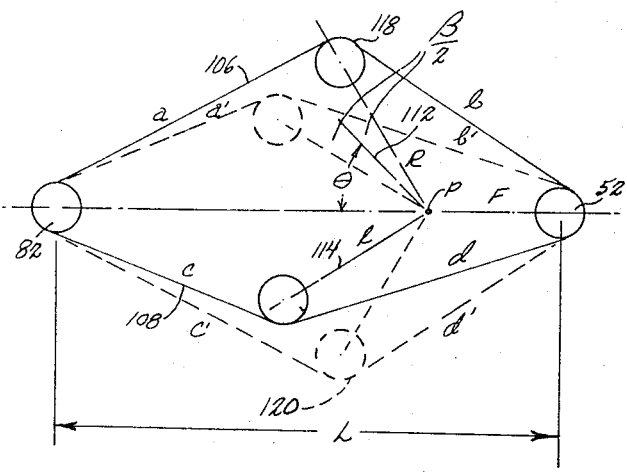
FIGURE 6 is a diagram showing the relationship of various parts of the apparatus before and after a phase shift has been made.

As indicated above, in order to change the output force produced by the vibratory apparatus, the weights in one of the housings must be revolved 180° relative to the weights in the other housing. Since a continuous, fixed length belt is used to operatively connect the oscillators together, this phase shift must be accomplished without substantially changing the length of the belt. In other words, as depicted in FIGURE 6, the total length of the first and second runs $a+b+c+d$ before the phase shift, must be substantially the same as the total length of the first and second runs $a'+b'+c'+d'$ after the phase shift. The total belt adjustment, i.e. the relative change in the length of the first and second runs, to achieve a phase shift of 180° is dependent upon the diameter of the pulleys used, and it is determined by the formula $\pi D/2$, where D equals the diameter of the pulley.

The mechanism for accomplishing the phase shift must be carefully designed with respect to certain dimensions in order to achieve a desired phase shift without substantially changing the length of the belt connecting the shafts together. These dimensions include:

(1) The distance between the shafts 44 and 74, referred to hereinafter as the distance L;

(2) The distance of the bell crank pivot point P from the shaft 44 (or in the alternative, the shaft 74) along a line connecting the shafts 44 and 74 together, referred to hereinafter as the distance F;

(3) The length of the fixed length arms 112 and 114, referred to hereinafter as the length R;

(4) The angle through which the bell crank 104 is pivoted, referred to hereinafter as the angle $\beta$; and (5) The angle which the arm 106 makes with the line connecting the shafts together, when the arm bisects the angle $\beta$, referred to hereinafter as the angle $\theta$.

It has been found that by selecting certain predetermined values for these dimensions, a phase shift can be made without substantially changing the length of the belt, and that for a given value of R and $\beta$, there exists an optimum value of F which will result in a minimum change in the belt length. FIGURE 6 illustrates schematically in solid lines, a first geometrical shape of the belt before a phase shift has been made; and in broken lines, a second geometrical shape of the belt after a phase shift of 180° has been made by the pulley 82 relative to the pulley 52. Although the individual lengths $a$, $b$, $c$ and $d$ have changed, there has been a negligible change in the overall belt length $a+b+c+d$.

It is envisioned that various dimensions might be used in order to achieve a satisfactory system. For purposes of illustration, the following examples will illustrate two systems which could satisfactorily be used, because substantially no change in belt length resulted when a phase shift was made.

*Example I*

It was found that by selecting $L=30$ inches, $\theta=45°$, $F=10$ inches, $R=6$ inches, $\beta=20°$, and by using pulleys with a diameter ($d$) of 2.865 inches (which resulted in a total belt adjustment of 4.5 inches), the change in belt length was found to be less than .005 inch.

*Example II*

It was found that by selecting $L=30$ inches, $\theta=45°$, $F=8$ inches, $R=10$ inches, $\beta=30°$, and $D=2.865$ inches, the change in belt length was likewise found to be less than .005 inch.

Figure 7:
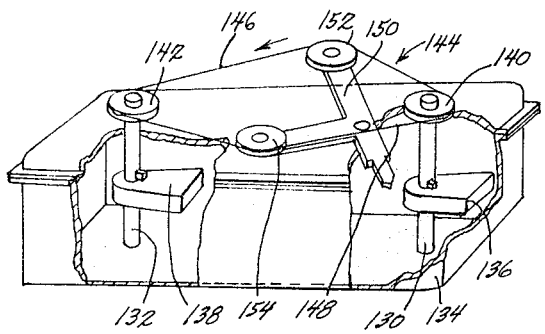
FIGURE 7 is a partial perspective view illustrating another embodiment of the invention.

Although the invention has been described in conjunction with a pair of oscillator housings connected to a horizontal conveyor, a pair of parallel shafts in each housing, an eccentrically weighted spur gear secured to each shaft, etc., it is envisioned that other embodiments might readily be used as well. FIGURE 7 for example, illustrates a pair of shafts 130 and 132 rotatably mounted in a housing 134. Fixedly secured to the shaft 130 is an eccentric weight 136, and fixedly secured to the shaft 132 is an eccentric weight 138. Fixedly secured to one end of the shaft 130 is a pulley or sheave 140, and fixedly secured to one end of the shaft 132 is a pulley or sheave 142. The shafts 130 and 132 are operatively connected together by means of a timing belt 144 which includes a first run 146 and a second run 148. A bell crank 150 is pivotally connected to the top of the housing 134, and a pair of pulleys 152 and 154 are rotatably connected to the arms of the bell crank. The bell crank 150 is positioned with respect to the timing belt 144 so that all of the pulleys lie in substantially the same plane and the pulleys 152 and 154 deflect the first and second runs 146 and 148 respectively. A motor (not shown in FIGURE 7) is operatively connected to the shaft 130 thereby causing it to rotate about its axis.

In operation, the shaft 130 and the eccentric weight 136 are caused to rotate about the axis of the shaft 130 when the motor operatively connected to the shaft is energized. The shaft 132 and the eccentric weight 138 on the other hand, are likewise caused to rotate about the axis of the shaft 132 in the same direction as the shaft 130, by means of the timing belt 144 which operatively connects the shafts together. By pivoting the bell crank 150 while the shafts are rotating, the shaft 132 and the weight 138 are revolved with respect to the shaft 130 and the weight 134, thereby changing the phase relationship of the weights 134 and 138 with respect to each other, as well as the shafts with respect to each other, thereby changing the type of force produced by the vibratory apparatus. The effective lengths of the first and second runs are changed with respect to each other in substantially the same manner as that described hereinbefore, without any appreciable change in the belt length.

Figure 8:
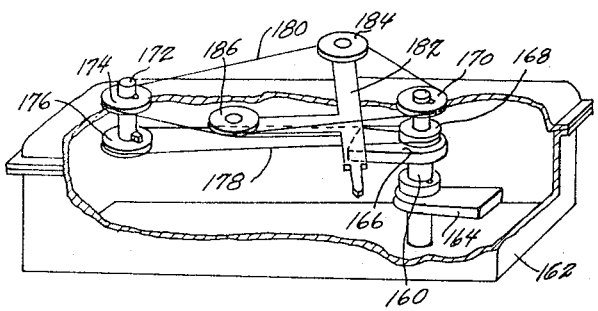
FIGURE 8 is a partial perspective view illustrating a further embodiment of the invention.

FIGURE 8 illustrates another embodiment of the invention which utilizes an adjusting mechanism similar to that described hereinbefore. In this embodiment, a single shaft 160 is rotatably mounted in a housing 162. Fixedly secured to the shaft 160 is a first eccentric weight 164, and rotatably mounted with respect to the shaft 160 is a second eccentric weight 166, which is provided with an integral sheave or pulley portion 168. Fixedly secured to one end of the shaft 160 is a pulley 170, the other end of the shaft being operatively connected to a motor (not shown). A shaft 172 is rotatably mounted in the top of the housing 162, and it is provided with a pair of pulleys 174 and 176 fixedly connected to the shaft in such a manner that the latter pulley is positioned within the housing 162. If desired, a longer shaft 172 could be used so that it is rotatably mounted in the bottom of the housing 162. A timing belt 178 operatively connects the pulley 176 to the sheave portion 168; and a timing belt 180 operatively connects the pulley 174 and the shaft 172 to the pulley 170 and the shaft 160. A bell crank 182, having pulleys 184 and 186 rotatably connected to its arms, is pivotally attached to the top of the housing 162. All of the pulleys lie in the same plane, and the pulleys 184 and 186 deflect the timing belt runs in the same manner as that described above. It is envisioned that a device similar to that depicted in FIGURE 8, might be used for example as a gyratory drive for a gyratory sifter.

In operation, when the shaft 160 is caused to rotate about its axis, the eccentric weight 164 likewise rotates in the same direction. The shaft 172 and the pulley 176 also rotate about the axis of the shaft 172 in the same relative direction. As the pulley 176 rotates, it causes the eccentric weight 166 to rotate about the axis of the shaft 160 in the same direction as the eccentric weight 164. By pivoting the bell crank 182, the phase relationship of the weights with respect to each other can be changed, so as to cancel each other out, or to fully complement each other. It should be realized of course, that if desired, the weights might be caused to rotate about the axis of the shaft 160 in opposite direction by crossing the timing belt 178.

Figure 9:
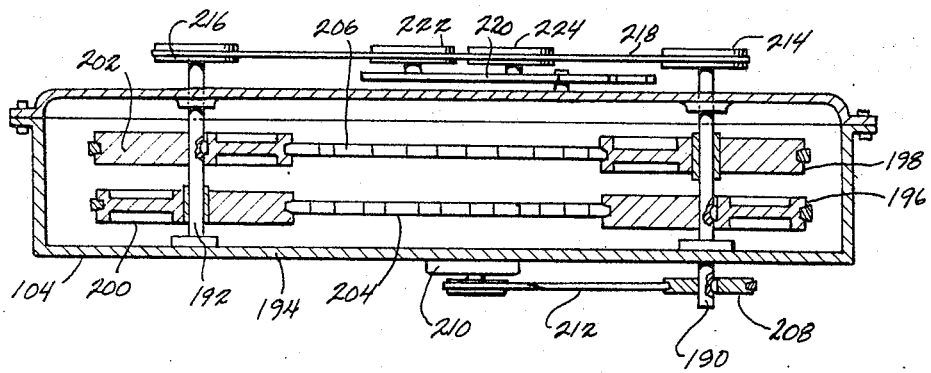
FIGURE 9 is a sectional view illustrating another modification of the invention.

In FIGURE 9, a pair of parallel shafts 190 and 192 are rotatably mounted within the housing 194 by appropriate means. A pair of eccentrically weighted sheaves are mounted on each of the shafts 190 and 192. A first eccentrically weighted sheave 196 is fixedly attached to the shaft 190, and a second sheave 198 is rotatably mounted on the shaft 190. Similarly, a first eccentrically weighted sheave 200 is rotatably mounted on the shaft 192 and a second sheave 202 is fixedly attached to the shaft 192. The sheaves 196 and 200 are operatively connected together by a timing belt 204, and the sheaves 198 and 202 are operatively connected together by a timing belt 206, so that they all rotate about the axis of their respective shafts in the same direction. The weighted sheaves 196 and 200 are positioned with respect to each other so that they are phased 180° apart; and the weighted sheaves 198 and 202 are positioned with respect to each other so that they are likewise phased 180° apart. A sheave 208 is fixedly secured to one end of the shaft 190, and it is operatively connected to a motor 210 by means of a belt 212. Fixedly secured to the other end of the shaft 190 is a pulley 214; and fixedly secured to one end of the shaft 192 is a pulley 216. The shafts 190 and 192 are operatively connected together by a timing belt 118 which partially encircles the pulleys 214 and 216. A bell crank 220, having pulleys 222 and 224 rotatably connected to its arms, is pivotally connected to the housing so that the pulleys deflect the timing belt 218 in the same manner as that described above. It is envisioned that a device similar to that illustrated in FIGURE 9 might be used for example in conjunction with a vertical or spiral conveyor.

In operation, when the motor 210 is energized, the shaft 190 and the pulley 196 are caused to rotate about the axis of the shaft 190; simultaneously, the sheave 200 is caused to rotate about the axis of the shaft 192 in the same relative direction. The shaft 192 on the other hand, is caused to rotate about its axis in the same relative direction by means of the timing belt 218 which operatively connects it to the shaft 190. The sheave 202, which is fixedly secured to the shaft 192, likewise rotates in the same relative direction, and it causes the sheave 198 to rotate in the same direction about the axis of the shaft 190. Therefore, both the shafts, and all of the weighted sheaves, rotate in the same relative direction. When the magnitude of vibratory force produced by the device is to be changed, the bell crank 220 is pivoted through a prescribed angle; as a result, the angular position of the shaft 192 with respect to the shaft 190 is changed, the angular position of the sheave 202 with respect to the sheave 200 is changed, and the angular position of the sheave 198 with respect to the sheave 196 is changed.

Figure 10:
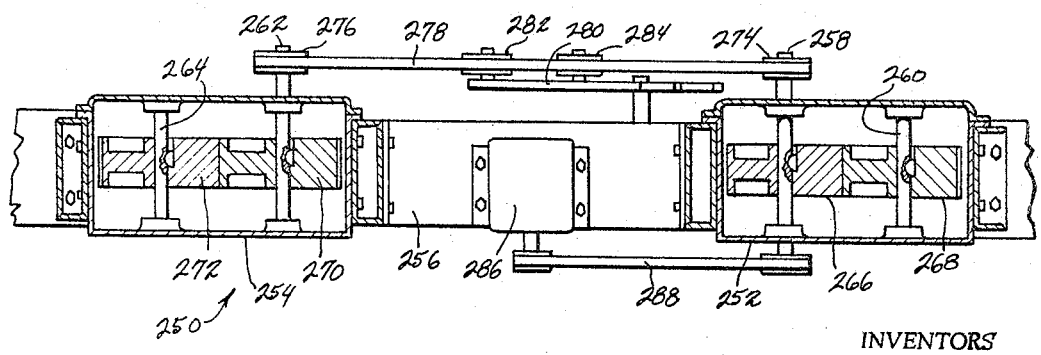
FIGURE 10 is a sectional view illustrating still another embodiment of the invention.

FIGURE 10 illustrates another embodiment of the invention which is similar to that described above in conjunction with FIGURES 1–5. In this embodiment, a vibratory apparatus 250 includes oscillator housings 252 and 254 separated from each other by a frame member 256. A first pair of parallel shafts 258 and 260 are rotatably mounted within the housing 252, and a second pair of parallel shafts 262 and 264 are rotatably mounted within the housing 254. All of the shafts are perpendicular to and lie along a common line which is parallel to the longitudinal axis of a conveyor to which the vibratory apparatus is attached.

Fixedly secured to each shaft is an eccentrically weighted spur gear; an eccentric weight 266 is attached to the shaft 258, an eccentric weight 268 is attached to the shaft 260, an eccentric weight 270 is attached to the shaft 262, and an eccentric weight 272 is attached to the shaft 264. The weights in each housing are phased with respect to each other so that a desired phase relationship exists between the weights of each pair, as well as between the two pairs of weights.

A sheave or pulley 274 is fixedly connected to one end of the shaft 258, and a sheave or pulley 276 is fixedly connected to one end of the shaft 262. The sheaves 274 and 276 are operatively connected together by a timing belt 278, and a bell crank 280 having idler pulleys 282 and 284 rotatably attached to it, is provided for deflecting the belt 278, in a manner similar to that described above. A motor 286 is provided for actuating the vibratory apparatus 250 by operatively connecting it to the shaft 258 by means of a belt 288.

In operation, the oscillators are actuated by energizing the motor 286, thereby causing all the shafts to rotate about their respective axes. When the eccentrically weighted spur gears are phased as shown in FIGURE 10, a maximum output force is produced. By pivoting the bell crank 280 while the shafts are rotating, the weights in the housing 254 are caused to revolve about the axis of their respective shafts, relative to the weights in the housing 252, thereby changing the magnitude of vibratory force produced by the apparatus.

The vibratory apparatus described herein, can be used for producing a vibratory force and transmitting vibratory motion to different types of devices, such as horizontal or vertical conveyors, gyratory sifters, or the like. By a simple adjustment of an adjusting mechanism, the magnitude of vibratory force produced can be varied from a zero magnitude to a predetermined maximum magnitude, or in varying intermediate ranges, by cancelling the vibratory force in its entirety, or by complementing the vibratory force, while the apparatus is in operation.

In the above description and the attached drawings, a disclosure of the principles of this invention is presented, together with some of the embodiments by which the invention may be carried out.

Now therefore, we claim:

1. A drive for an oscillating system comprising housing means, a pair of parallel shafts rotatably mounted in said housing means, pulley means secured to each shaft so that they lie in the same plane, flexible drive means for operatively connecting said pulleys together, means for rotating one of said shafts, an eccentric weight fixedly connected to each shaft, means for maintaining said eccentric weights at a predetermined phase relationship with respect to each other, and movable guide means operatively engaging said flexible drive means for revolving one of the shafts with respect to the other shaft while the shafts are rotating thereby causing the phase relationship of one of the shafts and its associated weight to be changed with respect to the other shaft and its associated weight, the phase relationship being variable from zero degrees to a maximum of 180°.

2. A drive for an oscillating system comprising housing means, at least one pair of parallel shafts rotatably mounted in said housing means, pulley means secured to one end of each shaft so that they lie in the same plane, flexible drive means for operatively connecting said pulleys together, means for continuously rotating one of said shafts, the other shaft being caused to also continuously rotate, an eccentric weight fixedly connected to each shaft, said weights having a predetermined phase relationship between them, means for revolving one of the shafts with respect to the other shaft while the shafts are rotating including a bell crank having a pair of equal length arms, pulley means rotatably connected to each arm so that they deflect the flexible drive means on opposite sides of a line between the shafts, means for pivotally connecting said bell crank relative to the housing so that it is interposed between the shafts and all the pulley means lie in the same plane, pivotal movement of said bell crank causing said one of the shafts to revolve about its longitudinal axis with respect to the other shaft thereby causing the phase relationship between said weights to be changed with respect to each other from zero degrees to a maximum of 180°.

3. In combination, a housing, at least one pair of parallel shafts rotatably mounted in said housing, a pulley secured to each shaft, an endless belt for operatively connecting said pulleys together, means for continuously rotating one of the shafts about its axis, the other shaft being caused to likewise continuously rotate about its axis, means for revolving one of the shafts with respect to the other shaft while the shafts are rotating including a bell crank having two arms perpendicularly positioned relative to each other, a pulley rotatably connected to each arm, all of the pulleys lying in the same horizontal plane, means for pivotally connecting said bell crank to the housing between the parallel shafts in such a manner that each arm is disposed on opposite sides of a line connecting said shafts together and the pulleys connected to said arms deflect the belt, pivotal movement of said bell crank causing the belt to revolve said one shaft about its axis with respect to the other shaft while both shafts are continuously rotating.

4. The combination of claim 3 wherein the length of the bell crank arms, the distance of the bell crank pivot point from the parallel shafts, and the angle through which the bell crank is pivoted, are predetermined so that when the one shaft is revolved about its axis with respect to the other shaft, there is substantially no change in the length of the belt.

5. In combination, a housing, first and second parallel shafts rotatably mounted in said housing, each shaft having at least one pulley secured to one end, a pair of eccentric weights, means for attaching one weight to one shaft and the other weight to the other shaft, means for maintaining said weights at a desired phase relationship with respect to each other, means for continuously rotating said first shaft about its axis, and endless fixed length belt for operatively connecting the pulleys together thereby continuously rotating the second shaft about its axis when the first shaft is rotated, an adjusting mechanism for revolving the second shaft with respect to the first shaft from zero to a maximum of 180° while the shafts are rotating, said means including a bell crank having two equal length arms, said arms being perpendicularly positioned with respect to each other, an idler pulley rotatably connected adjacent to the end of each arm, means for pivotally connecting said bell crank to the housing so that it is interposed between the parallel shafts in such a manner that each arm is disposed on opposite sides of a line connecting said shafts together and said idler pulleys deflect the belt, pivotal movement of said bell crank causing the belt to revolve said second shaft about its axis thereby changing the phase relationship of the eccentric weight on said second shaft with respect to the eccentric weight on the first shaft while the shafts are rotating.

6. A vibratory apparatus comprising housing means, a first pair of parallel shafts rotatably mounted in said housing means, at least one eccentric weight fixedly connected to each shaft, means for maintaining said weights at a predetermined phase relationship with respect to each other, a second pair of parallel shafts rotatably mounted in said housing means, said second pair being parallel to the first pair, at least one eccentric weight fixedly connected to each shaft, means for maintaining said weights at a predetermined phase relationship with respect to each other, the second pair of weights having a desired phase relationship with respect to the first pair of weights, means for rotating one of the shafts of said first pair of shafts, the other shafts being rotated in response to rotation of the one shaft, pulley means secured to at least one shaft of each pair of shafts, flexible drive means for operatively connecting said pulleys together, and an adjusting mechanism including a bell crank operatively engaging the flexible drive means for changing the phase relationship of the weights on the second pair of shafts with respect to the weights on the first pair of shafts while the shafts are rotating by revolving the second pair of shafts about their axes with respect to the first pair of shafts.

7. A vibratory apparatus comprising housing means, first and second pairs of parallel shafts rotatably mounted in said housing means, all of said shafts being parallel with respect to each other and being disposed within said housing means so that they lie along a common plane, at least one eccentric weight fixedly connected to each shaft, means for maintaining the weights connected to the first pair of shafts at a predetermined phase relationship with respect to each other, means for maintaining the weights connected to the second pair of shafts at a predetermined phase relationship with respect to each other, the pairs of weights having a desired phase relationship with respect to each other, means for rotating the shafts about their respective axes, a pulley secured to at least one shaft of each pair of shafts so that said pulleys lie in the same plane, an endless fixed length belt comprised of first and second runs for operatively connecting said pulleys together, and an adjusting mechanism for changing the phase relationshlp of one pair of weights with respect to the other pair of weights while the shafts are rotating, said mechanism including a bell crank having a pair of equal length arms, an idler pulley rotatably connected to each arm, means for pivotally connecting said bell crank relative to the housing so that it is interposed between the shafts and each idler pulley deflects one run of the belt, pivotal movement of said bell crank causing a first pair of shafts and their attached weights to revolve with respect to the other pair of shafts and their attached weights thereby causing the phase relationship between said first pair of shafts and weights to be changed with respect to each other, as well as with respect to the other pair of shafts and weights.

8. A vibratory apparatus comprising a housing, first and second parallel shafts rotatably mounted in said housing, flexible drive means comprised of first and second runs for operatively connecting said shafts together, first and second eccentric weights, means for fixedly connecting the first weight to the first shaft, means for rotatably mounting the second weight on said first shaft, means for operatively connecting said second weight to the second shaft so that rotation of said second shaft about its axis causes the second weight to rotate about the axis of the first shaft, means for rotating said shafts about their respective axes, and movable guide means for deflecting at least one of said runs, movement of said guide means causing the relative length of said runs to be changed thereby causing the second shaft to be revolved relative to the first shaft and the phase relationship of the first and second weights positioned on said first shaft to be changed with respect to each other while the shafts are rotating.

9. A vibratory apparatus comprising a housing, first and second parallel shafts rotatably mounted in said housing, flexible drive means comprised of first and second runs for operatively connecting said shafts together, a pair of eccentric weights mounted on each shaft, means for mounting a first weight of each pair of weights on its respective shaft so that they are phased 180° apart with respect to each other, means for maintaining said first weights in phased relationship, means for mounting the second weight of each pair of weights on its respective shaft so that said second weights are phased 180° apart with respect to each other, means for maintaining said second weights in phased relationship, means for rotating the shafts about their respective axes, and movable guide means for deflecting at least one of said runs, movement of said guide means causing the relative length of said runs to be changed thereby causing one of the shafts to be revolved relative to the other shaft and the phase relationship of the weights on each shaft to be changed with respect to each other while the shafts are rotating.

10. A vibratory apparatus comprising housing means, at least one pair of parallel shafts rotatably mounted in said housing means, a flexible belt comprised of first and second runs for operatively connecting said shafts together, movable guide means for deflecting said first and second runs so that a first four cornered geometrical shape of the belt is formed, means for rotating a first shaft of said pair of shafts, an eccentric weight fixedly connected to each shaft, means for maintaining said weights at a predetermined phase relationship with respect to each other, relative movement of said guide means causing the relative lengths of the first and second runs to be proportionately changed with respect to each other so that a second four cornered geometrical shape of the belt is obtained, said change in shapes being accomplished without changing the overall length of the belt, said movement causing the second shaft and its attached weight to be revolved about its axis with respect to the first shaft and its attached weight, the phase relationship of said shafts being variable from zero degrees to a maximum of 180°.

References Cited

UNITED STATES PATENTS

| | | | |
|---|---|---|---|
| 2,098,573 | 11/1937 | Dingle | 74—242.1 X |
| 2,352,797 | 7/1944 | Miller | 74—217 |
| 2,913,912 | 11/1959 | Radermacher | 74—61 |
| 3,076,549 | 2/1963 | Becker | 209—367 |
| 3,136,466 | 6/1964 | Antonucci | 74—242.8 |

FOREIGN PATENTS 658,718   10/1951   Great Britain.

FRED C. MATTERN, Jr., *Primary Examiner.*

BROUGHTON G. DURHAM, *Examiner.*

F. E. BAKER, *Assistant Examiner.*